United States Patent [19]

Gaertner

[11] Patent Number: 5,147,431
[45] Date of Patent: Sep. 15, 1992

[54] BUSHING ASSEMBLY FOR MAKING GLASS FIBERS

[75] Inventor: Dean J. Gaertner, New Kensington, Pa.

[73] Assignee: PPG Industries, Inc., Pittsburgh, Pa.

[21] Appl. No.: 713,477

[22] Filed: Jun. 11, 1991

[51] Int. Cl.$^5$ ............................................. C03B 37/09
[52] U.S. Cl. .................................................. 65/1; 65/2
[58] Field of Search .......................................... 65/1, 2

[56] References Cited

U.S. PATENT DOCUMENTS

| | | | |
|---|---|---|---|
| 2,460,547 | 2/1949 | Stevens | 65/1 |
| 2,482,299 | 9/1949 | Stevens | 65/1 |
| 3,134,659 | 5/1964 | Labino | 65/2 |
| 3,272,609 | 9/1966 | Benton | 65/1 |
| 3,511,916 | 5/1970 | Sinclair et al. | |
| 3,514,841 | 6/1970 | Woodward et al. | 65/1 X |
| 3,574,581 | 4/1971 | Strickland et al. | 65/1 |
| 3,607,185 | 9/1971 | Andrysiak | 65/86 |
| 3,615,314 | 10/1971 | Cunningham | 65/11 W |
| 3,628,931 | 12/1971 | Russell | 65/11 W |
| 4,043,778 | 8/1977 | Harris | 65/1 |
| 4,046,535 | 9/1977 | Stalego | 65/1 |
| 4,115,732 | 5/1979 | Schlachter et al. | 65/1 |
| 4,348,217 | 9/1982 | Williamson et al. | 65/2 |
| 4,363,645 | 12/1982 | Eisenberg | 65/2 |
| 4,553,994 | 11/1985 | Greene et al. | 65/2 |

FOREIGN PATENT DOCUMENTS

| | | | |
|---|---|---|---|
| 605797 | 7/1976 | U.S.S.R. | 65/1 |
| 1452801 | 1/1989 | U.S.S.R. | 65/1 |

OTHER PUBLICATIONS

The Manufacturing Technology of Continuous Glass Fibres by K. L. Loewenstein (1973), pp. 89–110.
The Manfacturing Technology of Continuous Glass Fibres, Second Edition, K. L. Loewenstein, B.Sc., Ph.D., F.S.G.T. (1983), pp. 118–154.

Primary Examiner—Robert L. Lindsay
Attorney, Agent, or Firm—James B. Robinson; Andrew C. Siminerio

[57] ABSTRACT

Bushings and bushing assemblies for supplying molten vitreous material in the form of exudations to be attenuated into filaments include a heat resistant cushioning material is provided under at least a portion of the flange portion of the bushing to thereby accommodate any thermal expansion of the bushing with respect to the insulation castable refractory material used to cement the bushing in place. The end walls of the bushing are contoured to thereby uniformly distribute the operating stresses occurring in the area of the junction of the flange and the side walls and the end walls of the bushing when the bushing is heated.

15 Claims, 2 Drawing Sheets

BUSHING ASSEMBLY FOR MAKING GLASS FIBERS

FIELD OF THE INVENTION

This invention relates to bushings for use in extruding fibers, and more particularly to bushings and bushing assemblies for supplying molten vitreous material in the form of exudations to be attenuated into filaments, wherein the bushing is designed to reduce the stresses in the bushing when it is heated to its operating temperature.

BACKGROUND OF THE INVENTION

The manufacture of fiber glass filaments and particularly textile fiber glass filaments is a high volume manufacturing process involving high temperatures. Typically, the process starts with the mixing of batch ingredients in precise proportions which is then melted in a high temperature furnace. While in the molten state the molten vitreous material is supplied to the bushing. The viscous glass is then drawn from the bushing in a continuous filament form by high speed precision winders through a plurality of filament orifices provided in the bottom wall of the bushing. The filaments are attenuated, cooled and gathered together to form strands.

Any process downtime is costly in terms of equipment replacement and repair and lost product output. Developments are continually being made to the equipment that performs the various fiber glass filament/strand forming functions to improve their overall performance and useful life.

The bushing, which plays a very important role in the overall manufacturing process has been the subject of considerable development efforts.

Examples of such development efforts can be found in U.S. Pat. Nos. 3,511,916; 3,514,841; 3,74,581 and 3,615,314 as well as in a book by K. L. Lowenstein, B.Sc., Ph.D., F.S.G.T. entitled "The Manufacturing Technology of Continuous Glass Fibres"; the first edition published by Elsevier Scientific Publishing Company of Amsterdam, The Netherlands, London, England and New York, N.Y., dated 1973. The second edition of this book was published in 1983 by the same publisher.

While there have been many efforts to improve the performance and useful life of the bushing, none of these efforts have satisfactorily solved the problem of bushing corner flange cracking. When such bushing corner flange cracking occurs, the molten glass may leak from the bushing thus requiring premature and costly bushing removal and replacement.

SUMMARY OF THE INVENTION

It is the primary object of this invention to provide an improved metal bushing for supplying molten vitreous material in the form of exudations to be attenuated into filaments, the bushing having side, end and bottom walls defining an open elongated interior chamber for the molten vitreous material, the bottom wall having a plurality of filament orifices, a continuous flange portion extending outwardly from the side and the end walls at the opening of the chamber, the improvement comprising the end walls of the bushing being contoured to thereby uniformly distribute the operating stresses occurring in the area of the junction of the flange, the side walls and the end walls when the bushing is heated.

Another object of this invention is to provide an improved metal bushing wherein the bushing is made from a metal selected from the group consisting of platinum, rhodium, palladium, ruthenium, iridium and alloys thereof.

Another object of this invention is to provide an improved metal bushing wherein the bushing is made from an alloy of 80 percent platinum and 20 percent rhodium.

Yet another object of this invention is to provide an improved metal bushing wherein the bushing is made from a grain stabilized alloy.

Still another object of this invention is to provide an improved metal bushing wherein at least a portion of the end walls of the bushing are contoured generally in the form of an outwardly projecting arc to define rounded portions at each end of the opening of the chamber.

Yet another object of this invention to is provide an improved metal bushing wherein the diameter of the arc is substantially equal to the width of the opening of the chamber.

Another object of this invention is to provide an improved metal bushing wherein the radius of the arc of the end walls progressively increases from the junction of the end wall with the flange portion and the side walls to the junction of the end wall with the bottom wall and the side walls.

Yet another object of this invention is to provide an improved metal bushing wherein a substantially straight line defines the junction of the end wall with the bottom wall.

Still another object of this invention is to provide an improved metal bushing wherein the flange portion is a planar member with an opening therethrough, the flange portion is fixedly attached to the ends of the side walls and the end walls and the shape of its opening conforms with the shape of the opening of the chamber defined by the side walls and the end walls.

Yet another object of this invention to provide an improved metal bushing wherein the outer edge of the flange portion is substantially rectangular in shape with rounded corners.

Another object of this invention is to provide an improved metal bushing wherein the area described by the opening of the chamber is substantially smaller than the area of the bottom wall.

Yet another object of this invention is to provide an improved metal bushing wherein the area described by the opening of the chamber is substantially equal to the area of the bottom wall.

Still another object of this invention is to provide an improved metal bushing wherein the side and bottom walls are planar members and are angularly joined, one with respect to the other.

Yet another object of this invention is to provide an improved metal bushing wherein the side and bottom walls are planar members and are perpendicularly joined, one with respect to the other.

Another object of this invention is to provide an improved metal bushing wherein the flange portion, the side, end and bottom walls are joined together by welding to form the bushing.

Yet another object of this invention is to provide an improved metal bushing wherein each the end wall are fabricated form about a 0.025 to 0.040 inch (0.63–1.0 mm) thick sheet of material and the side walls and the flange portion are fabricated form about a 0.020–0.030 inch (0.51–0.76 mm) thick sheet of material.

Another object of this invention is to provide an improved metal bushing wherein each the end wall are fabricated form 0.040 inch (1.0 mm) thick sheet of material and the side wall and flange portion are fabricated form a 0.025 inch (0.64 mm) thick sheet of material.

Another important object of this invention is to provide an improved metal bushing assembly for supplying molten vitreous material in the form of exudations to be attenuated into filaments, including a metal bushing having side, end and bottom walls defining an open elongated interior chamber for the molten vitreous material, the bottom wall having a plurality of filament orifices, a continuous flange portion extending outwardly from the side and the end walls at the opening of the chamber and a metal frame for supporting the bushing, the bushing cemented in place in the frame by a insulating castable refractory material, the improvement comprising a heat resistant cushioning material under at least a portion of the flange portion to thereby accommodate any thermal expansion of the bushing with respect to the insulating castable refractory material.

Yet another object of this invention is to provide an improved metal bushing assembly wherein the heat resistant cushioning material is interposed between the flange portion the side walls, the end walls and the insulating castable refractory material.

Still another object of this invention is to provide an improved metal bushing assembly wherein the heat resistant cushioning material includes a sheet of flexible heat resistant material under substantially all of the flange portion.

Yet another object of this invention is to provide an improved metal bushing assembly wherein the heat resistant cushioning material is fabricated from about a 0.060 to 0.150 inch (1.52–3.81 mm) thick sheet of material.

Another object of this invention is to provide an improved metal bushing assembly wherein the heat resistant cushioning material is fabricated from about a 0.125 inch (3.18 mm) thick sheet of material.

Another important object of this invention is to provide an improved metal bushing assembly for supplying molten vitreous material in the form of exudations to be attenuated into filaments, including a metal bushing having side, end and bottom walls defining an open elongated interior chamber for the molten vitreous material, the bottom wall having a plurality of filament orifices, a continuous flange portion extending outwardly from the side and the end walls at the opening of the chamber and a metal frame for supporting the bushing, the bushing cemented in place in the frame by a insulating castable refractory material, the improvement comprising a heat resistant cushioning material positioned under at least a portion of the flange portion to thereby accommodate any thermal expansion of the bushing with respect to the metal frame and the insulating castable refractory material and the end walls of the bushing being contoured to thereby uniformly distribute the operating stresses occurring in the area of the junction of the flange, the side walls and the end walls when the bushing is heated.

DESCRIPTION OF THE DRAWINGS

Further objects and benefits derived from the invention will become apparent from a consideration of the balance of the specification and drawings of the preferred form of this invention in which.

DESCRIPTION OF THE INVENTION

Figure 1:
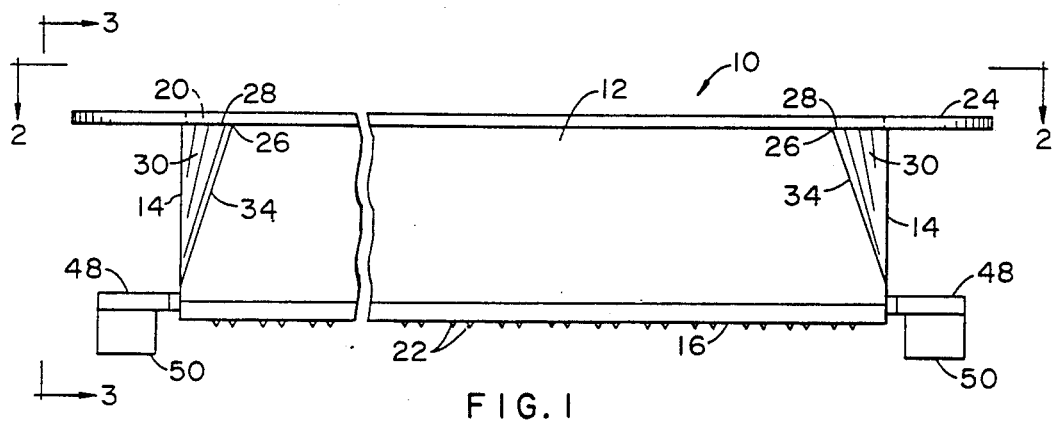
FIG. 1 is a side elevational view of the bushing of the present invention.
Figure 2:
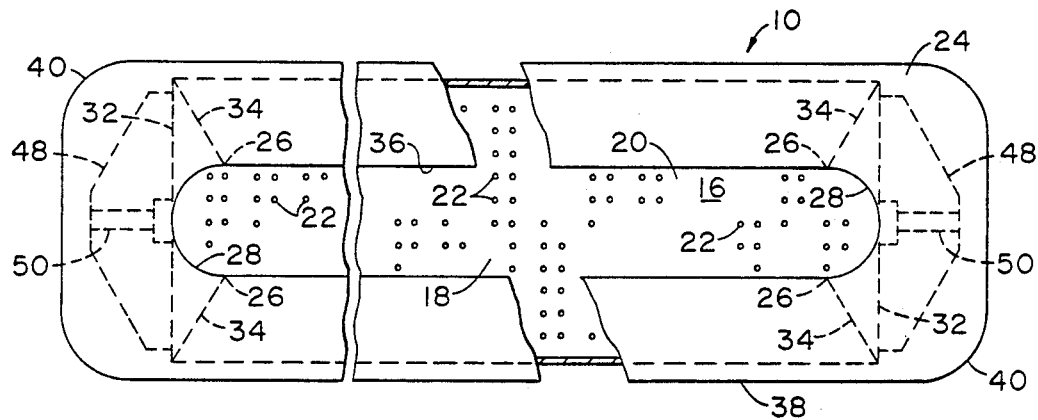
FIG. 2 is a top view of the bushing of FIG. 1.

Referring to the drawings, there is shown an improved metal bushing 10 for supplying molten vitreous material in the form of exudations to be attenuated into filaments (not shown).

The bushing 10, which may be fabricated from a number of different metals and alloys thereof including platinum, palladium, ruthenium, iridium, has side walls 12, end wall 14 and a bottom wall 16 which define an open elongated interior chamber 18 for the molten vitreous material having an opening 20. A metal alloy of 80 percent platinum and 20 percent rhodium (by weight) may be used for this purpose and the use of grain stabilized precious metals is also within the contemplation of this invention as regards the fabrication of the metal plates constituting the bushing 10.

The bottom wall 16 has a plurality of filament orifices 22, from which the viscous glass is drawn from the bushing 10 in a continuous filament form (not shown) by high speed precision winders (not shown). The filaments are attenuated, cooled and gathered together to form strands all in manner known to those skilled in the fiber glass filament/yarn art.

The bushing 10 is also provided with a cointinuous upper flange portion 24 extending outwardly from the side walls 12 and the end walls 14 at the opening 20 of the chamber 18. The flange portion 24, the side walls 12, the end walls 14 and the bottom wall 16 are joined together by welding to form the bushing 10. The tungsten inert gas (TIG) welding technique may be employed to perform this fabrication step.

One very important aspect of the present invention is the contouring of the end walls 14 to thereby uniformly distribute the operating stresses occurring at the junction between flange 24 and end wall 14 and between end wall 14 and side wall 12. It has been determined by appropriate testing, measuring and modeling techniques, as for example finite element analysis, that such uniform distribution of these operating stresses will substantially reduce or eliminate the problem of bushing corner flange cracking with its costly consequences.

Bushing corner flange cracking occurs as a result of stress rupture which is an accelerated creep mechanism attributed to the combined effect of high stresses at elevated temperatures. Elevated bushing temperatures in the range of 2000° F. (1093° C.) are typical in the fiber glass filament forming process. It has been found that the highest concentration of thermally induced stresses occurs at junction 26, which is the point of intersection between the flange 24, side wall 12 and end wall 14. It is, therefore, very important objective of this invention that the high stress concentrations, particularly those that occur in the area of the junction 26, be substantially reduced or eliminated to avoid stress rupture and bushing corner flange cracking.

The contouring of the end walls 14 so that it intersects flange 24 along curved junction 28 and also provides a smooth transition between side walls 12 and end walls 14, uniformly distributes these high operating stresses which occur in these critical areas of the bushing 10, and most importantly at junction 26, to achieve this important objective. Temperature profile tests were conducted on the bushing of the present invention by placing thermocouples at different locations of the bushing. As the bushing body temperature rose, the thermocouple readings indicated that any major temperature gradient experienced in the flange portion 24 area was significantly displaced from the critical area of the junction 26 to along junction 28.

Tests on the prior art square cornered bushing with "flat" end walls indicated major temperature gradients immediately in the area of junction of the flange with the end and side walls results in a high stress concentration causing stress rupture and bushing corner flange cracking.

In its preferred form, a portion of the end walls 14 of the bushing 10 are contoured generally in the form of an outwardly projecting arc to define rounded portions 30 at each end of the opening 20 of the chamber 18. The diameter of the arc is substantially equal to the width of the mouth or opening 20 of the chamber 18 along junction 28.

Figure 3:
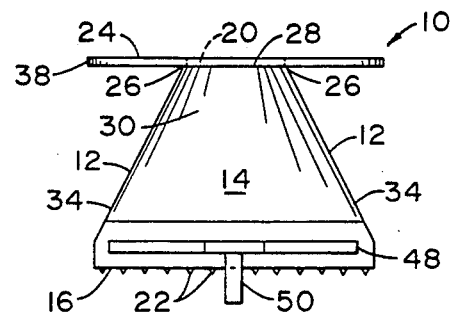
FIG. 3 is an end view of the bushing of FIG. 1.
Figure 4:
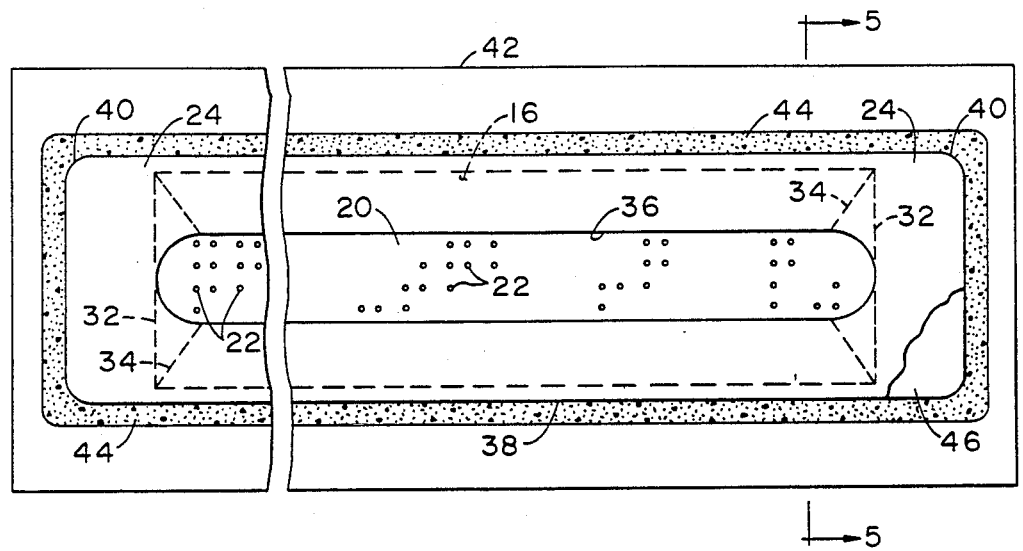
FIG. 4 is a view similar to FIG. 2 illustrating the bushing cemented in place in its associated frame. with portions removed for clarity.

The area described by the opening 20 of the chamber 18 is substantially smaller than the area of the bottom wall 16 and, as can be seen in FIGS. 3 and 4, the bushing 10 is in the form of a truncated triangle in cross section and the side walls 12 and the bottom wall 16 are planar members and are angularly joined, one with respect to the other. The bushing, according to the present invention, may be fabricated in other configurations, as for example, the bushing 10 may be in the form of a square or rectangle in cross section and the side walls 12 and the bottom wall 16 may be perpendicularly joined, one with respect to the other. Further, parts of the flange portion 24 and the side walls 12 may be of a one-piece construction and formed from a single sheet of metal.

The end walls 14 are shaped such that the radius of the arcs forming the side wall progressively increases from the junction 28 of each end wall 14 with the flange portion 24 and the side walls 12 to the junction 32 of the end wall 14 with the bottom wall 16, which is substantially a straight line. End walls 14 meet side walls 12 along substantially straight line 34.

The flange portion 24 is a planar member with an opening 36 therethrough. The flange portion 24 is welded to the ends of the side walls 12 and the end walls 14 and the shape of its opening 36 conforms with the shape of the opening 20 of the chamber 18 defined by the side walls 12 and the contoured end walls 14. The outer edge 38 of the flange portion 24 is substantially rectangular in shape with rounded corners 40.

The bushing 10 may be formed from the above described materials and the flange portion 24 and side walls 12 may be fabricated from about a 0.020 to 0.035 inch (0.50 to 0.89 mm) thick sheet of this material. To make a smooth transition weld with the flange/side wall construction and to eliminate the need for a additional reinforcement weld, the contoured end walls may be fabricated from about a 0.025 to 0.040 inch (0.64 to 1.0 mm) thick sheet of the material. Typically, the end wall and flange portion are fabricated from about a 0.040 inch (1.0 mm) thick sheet material and the side wall is fabricated from about a 0.025 inch (0.64 mm) thick sheet of material.

Figure 5:
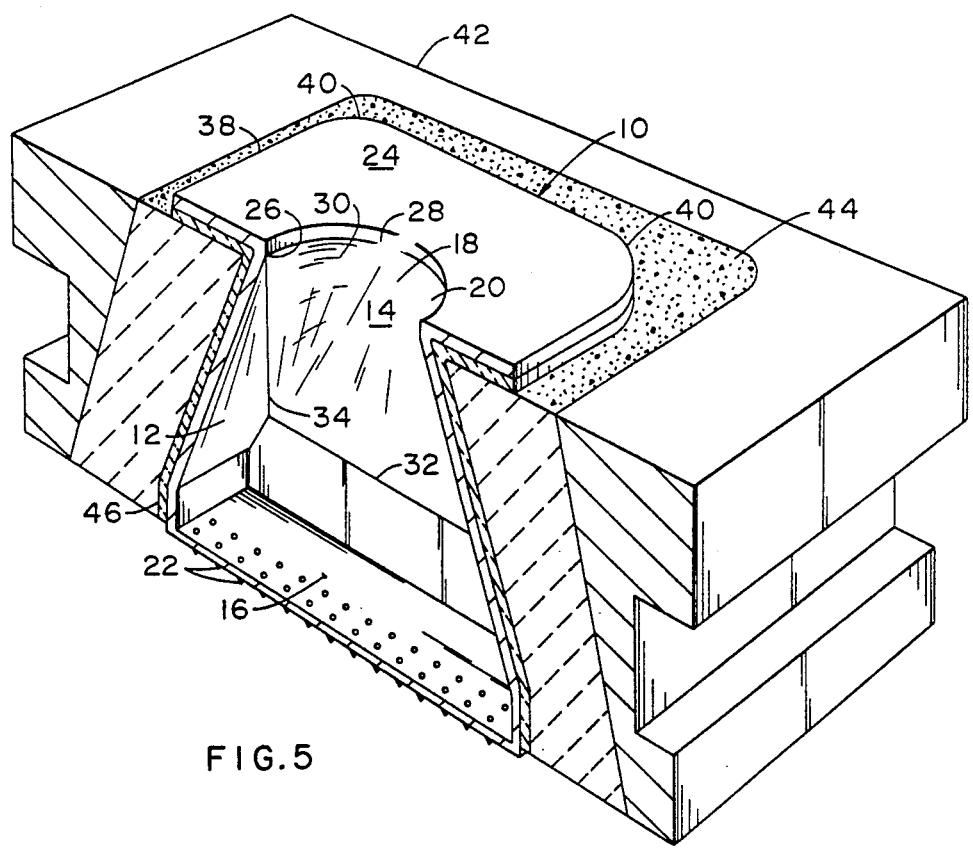
FIG. 5 is a sectional isometric view of the bushing taken along line 5—5 of FIG. 4, illustrating in more detail the end wall construction and the placement of the cushioning material.

As can best be seen in FIGS. 4 and 5, the bushing 10 is supported in a metal frame 42 which may be fabricated from cast iron. The bushing 10 is cemented in place in the frame 42 by an insulating castable refractory material 44. The insulating castable refractory material 44 may be a lightweight refractory material as manufactured by the Harbison-Walker Corporation under their trade designation "H-W LIGHTWEIGHT CASTABLE 30".

Another very important aspect of the present invention is the heat resistant cushioning material 46 is positioned under the flange portion 24 to accommodate any thermal expansion of the bushing 10 with respect to the insulating castable refractory material 44. The heat resistant cushioning material 46 is collapsible and acts as an expansion joint between the bushing and its associated frame 42 and refractory cement 44.

The heat resistant cushioning material 46 may be about a 0.060 to 0.150 inch (1.52 to 3.81 mm) sheet of material as manufactured by The Carborundum Company under their trade designation "FIBERFRAX 970 Paper". Typically, a 0.125 inch (3.18 mm) thick sheet of FIBERFRAX ® material provides suitable cushioning for the bushing 10 during operation.

The placement of cushioning material around the side and end walls of a bushing provides only limited relief of the thermally induced stresses that occur in the bushing body. Placement of the heat resistant cushioning material 46 under the flange portion 24 accommodates thermal expansion of the entire bushing 10 including the thermal expansion of the flange portion 24 and decreases the magnitude of the above described thermally induced stresses.

To prepare the bushing 10 for assembly with the forehearth of its associated furnace (not shown), a single sheet of the cushioning material 46 is placed around the bushing body and under substantially all of the flange portion 24. A second layer or thickness of cushioning material 46 is provided at the end walls 14 to accommodate for the linear expansion of the bushing 10. The bushing 10 with its cushioning material 46, is placed in the cast iron frame 42 and castable refractory cement 44 is poured around the bushing 10 and between frame 42. When the cement hardens, the bushing/frame assembly is now ready to be placed in operation. The bushing 10 and the frame 42 are provided with the typical furnace attachment hardware. For example, the bushing 10 is provided with terminals 48 and ears 50 which are required to electrically connect it to an electrical power supply (not shown) to power or heat the bushing 10. The frame 42 is provided furnace pin locators 52 to mechanically position the bushing assembly with respect to the furnace (not shown).

The present embodiments of this invention are to be considered in all respects as illustrative and not restrictive, the scope of the invention being indicated by the appended claims rather than by the foregoing description, and all changes which come within the meaning and range of equivalency of the claims therefore are to be embraced therein.

What I claim is:

1. A metal bushing for supplying molten vitreous material in the form of exudations to be attenuated into filaments, said bushing having side, end and bottom walls defining an open, elongated interior chamber for said molten vitreous material, said bottom wall having a plurality of filament orifices, a continuous flange portion extending outwardly from said side and said end walls at an opening of said chamber, the improvement comprising said end walls of said bushing being contoured to thereby uniformly distribute the operating stresses occurring in the area of the junction of said flange with said side walls and end walls when said bushing is heated.

2. The metal bushing of claim 1 wherein said bushing is made from a metal selected from the group consisting of platinum, rhodium, palladium, ruthenium, iridium and alloys thereof.

3. The metal bushing of claim 1 wherein at least a portion of said end walls of said bushing are contoured generally in the form of an outwardly projecting arc to define rounded portions at each end of said opening of said chamber.

4. The metal bushing of claim 3 wherein the diameter of said arc at the junction of said end wall and said flange portion is substantially equal to the width of said opening of said chamber.

5. The metal bushing of claim 4 wherein the radius of said arc of said end walls progressively increases from the junction of said end wall with said flange portion and said side walls to the junction of said end wall with said bottom wall and said side walls.

6. A metal bushing of claim 4 wherein said flange portion is a planar member with an opening therethrough, said flange portion is fixedly attached to the ends of said side walls and said end walls and the shape of said opening in said flange portion conforms with the shape of said opening of said chamber defined by said side walls and said end walls.

7. The metal bushing of claim 4 wherein a substantially straight line defines the junction of said end wall with said bottom wall.

8. The metal bushing of claim 7 wherein the area described by said opening of said chamber is substantially smaller than the area of said bottom wall.

9. The metal bushing of claim 7 wherein the area described by said opening of said chamber is substantially equal to the area of said bottom wall.

10. The metal bushing of claim 7 wherein said side and bottom walls are planar members and are angularly joined, one with respect to the other.

11. The metal bushing of claim 7 wherein said side and bottom walls are planar members and are perpendicularly joined, one with respect to the other.

12. A metal bushing of claim 7 wherein the outer edge of said flange portion is substantially rectangular in shape with rounded corners.

13. The metal bushing of claim 12 wherein each said end wall are fabricated from about a 0.025 to 0.040 inch thick sheet of material and said side walls and said flange portion are fabricated form about a 0.020 to 0.030 inch thick sheet of material.

14. The metal bushing of claim 13 wherein each said end wall are fabricated form 0.040 inch thick sheet of material and said side wall and flange portion are fabricated form a 0.025 inch thick sheet of material.

15. The metal bushing of claim 1 further comprising a heat resistant cushioning material between at least a portion of said flange portion and an insulating castable refractory material which cements said bushing in place in a metal frame which supports said bushing, to thereby accommodate any thermal expansion of said bushing with respect to said insulating castable refractory material.

* * * * *

UNITED STATES PATENT AND TRADEMARK OFFICE
CERTIFICATE OF CORRECTION

PATENT NO. : 5,147,431
DATED : September 15, 1992
INVENTOR(S) : Dean J. Gaertner It is certified that error appears in the above-indentified patent and that said Letters Patent is hereby corrected as shown below:

Column 8, Claim 13, line 4, the word "form" should be --from--.

Column 8, Claim 14, lines 2 and 4, the word "form" should be --from--.

Signed and Sealed this

Thirtieth Day of August, 1994

Attest:

BRUCE LEHMAN

Attesting Officer

Commissioner of Patents and Trademarks